(12) United States Patent
Byun et al.

(10) Patent No.: US 8,790,803 B2
(45) Date of Patent: Jul. 29, 2014

(54) RECHARGEABLE BATTERY

(75) Inventors: Sangwon Byun, Yongin-si (KR); Jeongwon Oh, Yongin-si (KR)

(73) Assignees: Samsung SDI Co., Ltd., Yongin-si (KR); Robert Bosch GmbH, Stuttgart (DE)

(*) Notice: Subject to any disclaimer, the term of this patent is extended or adjusted under 35 U.S.C. 154(b) by 90 days.

(21) Appl. No.: 13/333,980

(22) Filed: Dec. 21, 2011

(65) Prior Publication Data

US 2013/0017420 A1 Jan. 17, 2013

(30) Foreign Application Priority Data

Jul. 12, 2011 (KR) ........................ 10-2011-0068829

(51) Int. Cl.
*H01M 10/34* (2006.01)

(52) U.S. Cl.
USPC .............. 429/61; 429/121; 429/122; 429/123

(58) Field of Classification Search
USPC ..................... 429/61, 121, 122, 123
See application file for complete search history.

(56) References Cited

U.S. PATENT DOCUMENTS

| | | | |
|---|---|---|---|
| 2002/0113685 A1 | 8/2002 | Izaki et al. | |
| 2004/0196133 A1* | 10/2004 | Kawanishi | 337/159 |
| 2011/0081560 A1 | 4/2011 | Kim et al. | |
| 2011/0183193 A1 | 7/2011 | Byun et al. | |
| 2011/0244281 A1 | 10/2011 | Byun | |
| 2011/0300419 A1* | 12/2011 | Byun | 429/61 |

FOREIGN PATENT DOCUMENTS

| | | |
|---|---|---|
| JP | 2002-042621 | 2/2002 |
| KR | 10-2011-0036381 | 4/2011 |
| KR | 10-1042808 B1 | 6/2011 |
| KR | 10-2011-0133255 | 12/2011 |
| KR | 10-2012-0002406 | 1/2012 |

OTHER PUBLICATIONS

KIPO Office Action dated Nov. 11, 2012 for corresponding Korean Application No. 10-2011-0068829, noting JP 2002-042621 and KR 10-2011-0036381 listed above (4 sheets).

* cited by examiner

*Primary Examiner* — Jane Rhee (74) *Attorney, Agent, or Firm* — Christie, Parker & Hale, LLP (57) ABSTRACT

A rechargeable battery including an electrode assembly including a first electrode plate, a second electrode plate, and a separator between the first electrode plate and the second electrode plate; a first collector plate electrically connected to the first electrode plate and including a fuse unit therein; a second collector plate electrically connected to the second electrode plate; and a case housing the electrode assembly, the first collector plate, and the second collector plate, the fuse unit being formed of a first material, and regions of the first collector plate other than the fuse unit being formed of a second material different from the first material.

14 Claims, 6 Drawing Sheets

RECHARGEABLE BATTERY

CROSS-REFERENCE TO RELATED APPLICATION

This application claims priority to and the benefit of Korean Patent Application No. 10-2011-0068829, filed on Jul. 12, 2011 in the Korean Intellectual Property Office, the entire content of which is incorporated herein by reference.

BACKGROUND

1. Field

Aspects of embodiments of the present invention relate to a rechargeable battery.

2. Description of the Related Art

Rechargeable batteries are rechargeable, unlike primary batteries. Rechargeable batteries include a low-capacity battery, including a battery cell in the form of a pack which may be used for small portable electronic devices (e.g., cellular phones and camcorders), and a high-capacity battery including dozens of battery cells connected to one another, which are widely used as a motor-driving power source, such as for electric scooters, hybrid vehicles, or electric vehicles.

Rechargeable batteries may be manufactured in various shapes, such as a cylindrical shape and a prismatic shape. A rechargeable battery may be manufactured by forming an electrode assembly by disposing an insulating separator between a positive electrode plate and a negative electrode plate, placing the electrode assembly in a case together with electrolyte, and disposing a cap plate on the case. The electrode assembly may be connected to positive and negative terminals which protrude from the cap plate and are exposed to the exterior of the electrode assembly.

A rechargeable battery may generate excessive heat due to overcharge, or may burn or explode due to an increase of an internal pressure when electrolyte is decomposed. Thus, a rechargeable battery configured to improve the safety is needed.

SUMMARY

According to an aspect of embodiments of the present invention, a rechargeable battery has improved safety by rapidly cutting off a flow of current in an occurrence of an internal short circuit, an external short circuit due to an external conductive object, or a short circuit due to penetration of an external conductive object, by forming a fuse unit using a different material from regions of a collector plate other than the fuse unit.

According to an embodiment of the present invention, a rechargeable battery includes: an electrode assembly including a first electrode plate, a second electrode plate, and a separator between the first electrode plate and the second electrode plate; a first collector plate electrically connected to the first electrode plate and including a fuse unit therein; a second collector plate electrically connected to the second electrode plate; and a case housing the electrode assembly, the first collector plate, and the second collector plate, wherein the fuse unit is formed of a first material, and regions of the first collector plate other than the fuse unit are formed of a second material different from the first material.

The first material may have an electrical resistance greater than that of the second material.

The second material may be copper or aluminum.

The first material may be stainless steel, nickel, or steel.

In one embodiment, the fuse unit includes a fuse body shaped as a plate; a fuse hole penetrating both a surface of the fuse body and another surface opposite the surface; and a fuse protrusion extending from at least one of first and second sides of the fuse body adjacent to respective first and second ends of the fuse hole.

A cross-sectional area of a portion of the fuse body having the fuse hole may be smaller than that of the regions of the first collector plate other than the fuse unit.

The fuse protrusion may be bent upward or downward with respect to the surface of the fuse body.

The rechargeable battery may further include a first electrode terminal and a second electrode terminal electrically connected to the first collector plate and the second collector plate, respectively.

The first collector plate may include a connection part connected to the first electrode plate; a bent part bent and extending from a first end of the connection part and connected to an end of the fuse body; and an extension part extending from another end of the fuse body and connected to the first electrode terminal.

The bent part may be connected to the end of the fuse body by at least one of welding, riveting, or caulking The extension part may be connected to the another end of the fuse body by at least one of welding, riveting, or caulking.

The extension part may have a terminal hole penetrating top and bottom surfaces of the extension part, and the first electrode terminal may be connected to the extension part through the terminal hole.

A width of the fuse hole in a widthwise direction may be less than a width of the extension part in the widthwise direction.

The rechargeable battery may further include a cap assembly including a cap plate sealing an opening of the case, wherein the first electrode terminal and the second electrode terminal protrude to an outside of the case through the cap plate.

According to an aspect of embodiments of the present invention, in a rechargeable battery, different regions of a fuse unit and a collector plate are formed using different materials, thereby facilitating melting of the fuse unit to rapidly cut off a flow of current in an occurrence of an internal short circuit, an external short circuit due to an external conductive object, or a short circuit due to penetration of an external conductive object. As such, a rechargeable battery according to embodiments of the present invention has improved safety and is suited for use as a motor-driving power source for propelling electric scooters, hybrid vehicles, or electric vehicles.

According to an aspect of embodiments of the present invention, when a short circuit is generated in the rechargeable battery according to embodiments of the present invention, a battery case is changed in a state of a neutral cell, thereby increasing the reliability of the fuse unit functioning as a fuse and improving the safety of the battery.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and aspects of the present invention will become more apparent by describing in detail some exemplary embodiments thereof with reference to the attached drawings in which.

DETAILED DESCRIPTION OF THE INVENTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1:
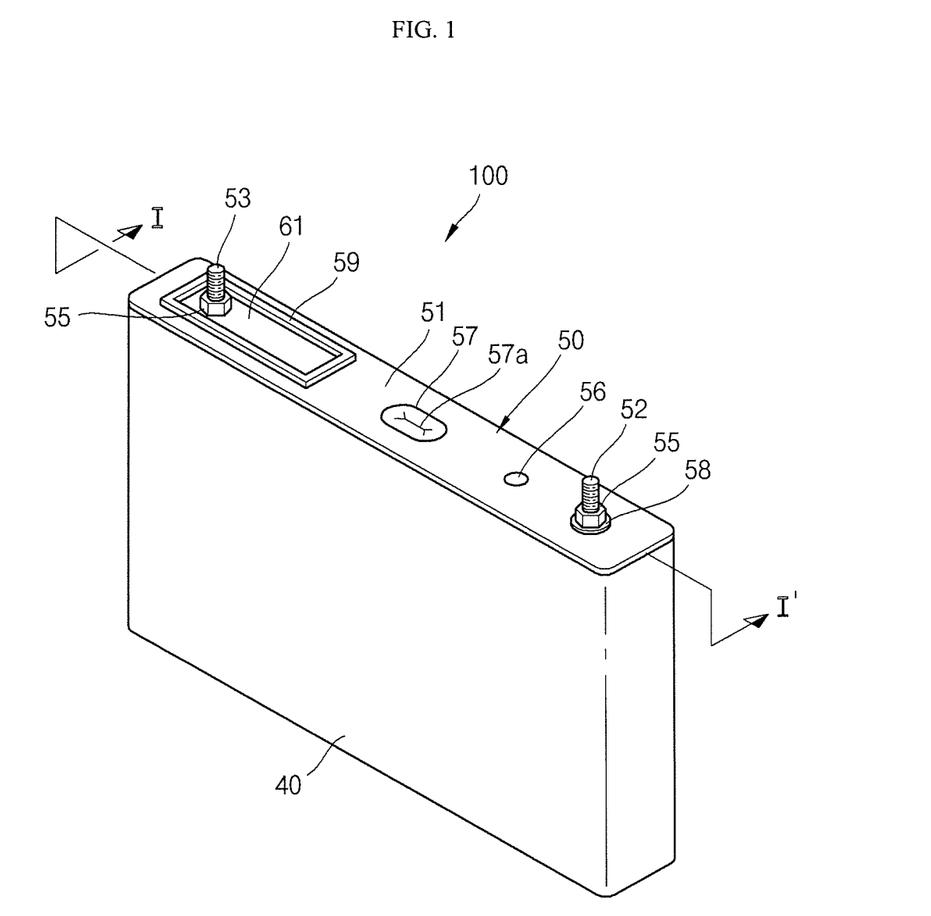
FIG. 1 is a perspective view of a rechargeable battery according to an embodiment of the present invention.
Figure 2:
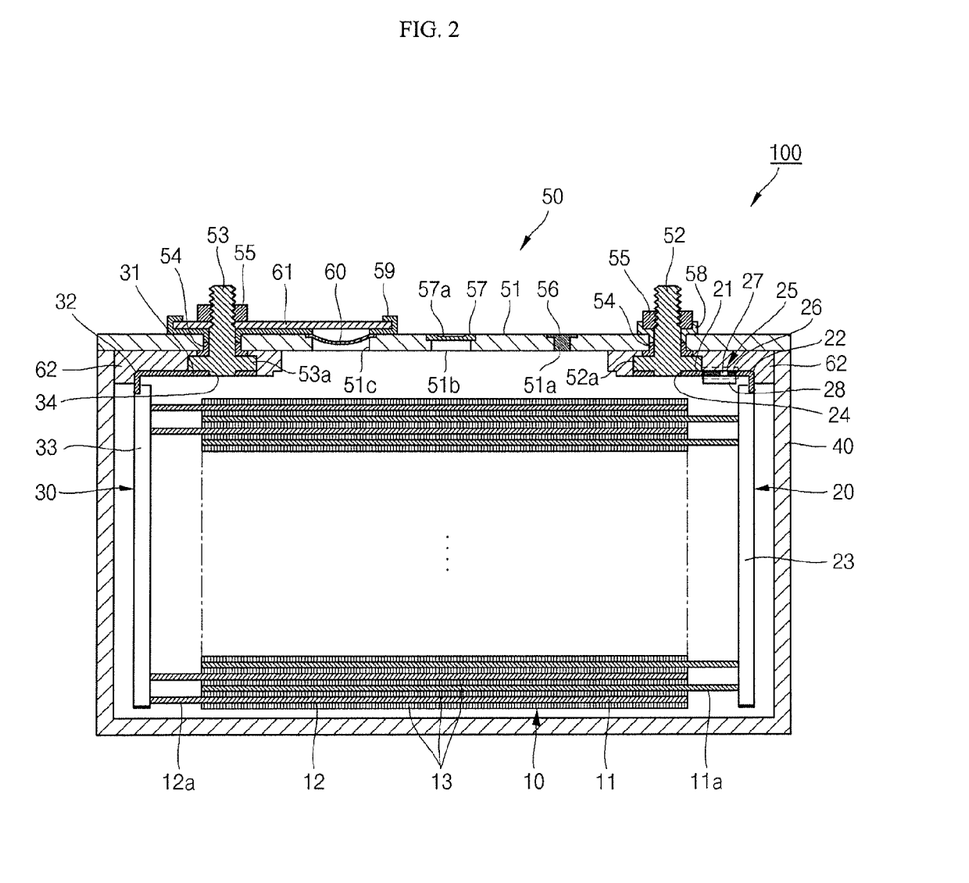
FIG. 2 is a sectional view of the rechargeable battery of FIG. 1, taken along the line I-I'.
Figure 3:
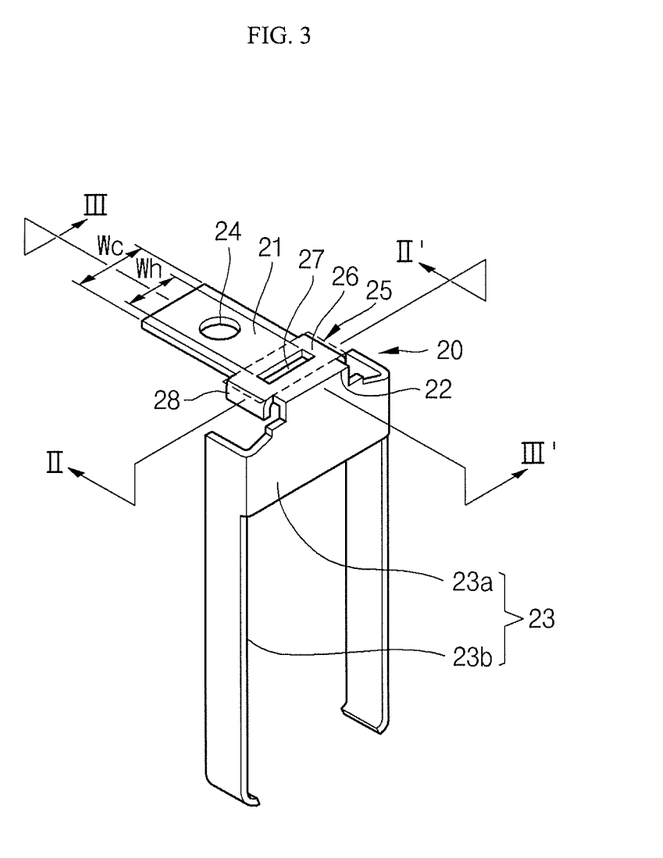
FIG. 3 is a perspective view of a first collector plate of the rechargeable battery of FIG. 1, according to an embodiment of the present invention.
Figure 4:
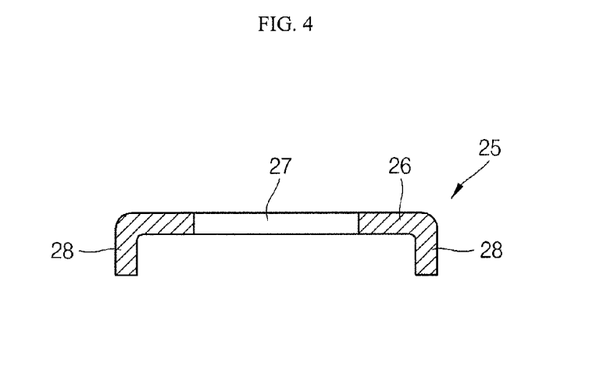
FIG. 4 is a sectional view of the first collector plate of FIG. 3, taken along the line II-II'.
Figure 5:
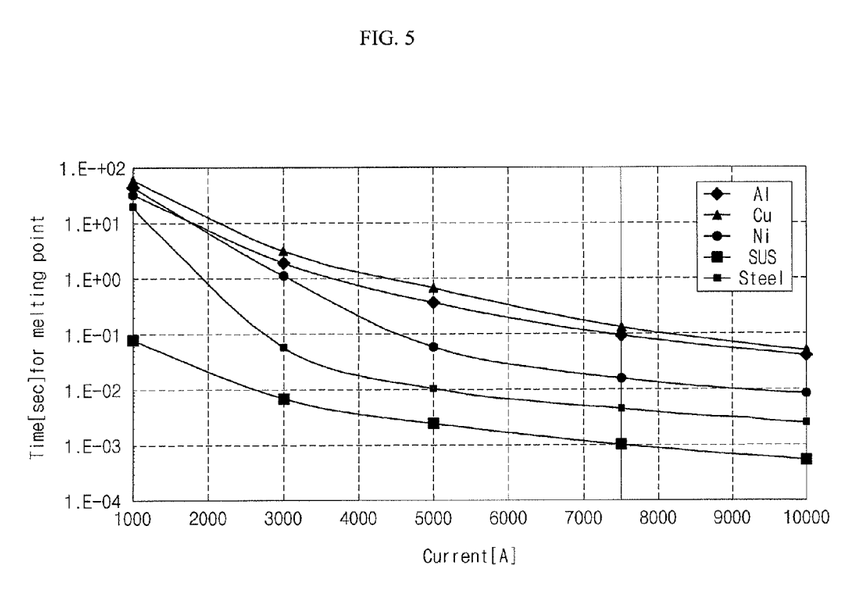
FIG. 5 is a graph illustrating a relationship between a current and a time for melting points of various materials for forming the first collector plate and a fuse unit of the rechargeable battery of FIG. 1.

FIG. 1 is a perspective view of a rechargeable battery according to an embodiment of the present invention; FIG. 2 is a sectional view of the rechargeable battery of FIG. 1, taken along line I-I'; FIG. 3 is a perspective view of a first collector plate of the rechargeable battery shown in FIG. 2, according to an embodiment of the present invention; FIG. 4 is a sectional view of the first collector plate of FIG. 3, taken along the line II-II'; and FIG. 5 is a graph illustrating a relationship between a current and a time for melting points of various materials for forming the first collector plate and a fuse unit shown in FIG. 2.

Referring to FIGS. 1 and 2, a rechargeable battery 100, according to an embodiment of the present invention, may include an electrode assembly 10, a first collector plate 20, a second collector plate 30, a case 40, and a cap assembly 50.

The electrode assembly 10 may be formed by winding or stacking a first electrode plate 11, a separator 13, and a second electrode plate 12, which have a thin plate or film shape. The first electrode plate 11 may function as a positive electrode, and the second electrode plate 12 may function as a negative electrode. Alternatively, the first electrode plate 11 may function as a negative electrode, and the second electrode plate 12 may function as a positive electrode.

The first electrode plate 11 may be formed by applying a first electrode active material, such as a transition metal oxide, to a first electrode collector formed of metal foil, such as aluminum foil, and may include a first electrode non-coating portion 11a to which the first electrode active material is not applied. The first electrode non-coating portion 11a functions as a current flow path between the first electrode plate 11 and an outside of the first electrode plate 11. According to embodiments of the present invention, materials that may be used to form the first electrode plate 11 are not limited to the above-mentioned materials.

The second electrode plate 12 may be formed by applying a second electrode active material, such as graphite or carbon, to a second electrode collector formed of metal foil, such as nickel or copper foil, and may include a second electrode non-coating portion 12a to which the second electrode active material is not applied. The second electrode non-coating portion 12a functions as a current flow path between the second electrode plate 12 and an outside of the second electrode plate 12. According to embodiments of the present invention, materials that may be used to form the second electrode plate 12 are not limited to the above-mentioned materials.

The polarities of the first and second electrode plates 11 and 12 may be changed with each other. That is, the first electrode plate 11 may function as a negative electrode, and the second electrode plate 12 may function as a positive electrode.

The separator 13 may be disposed between the first electrode plate 11 and the second electrode plate 12 to prevent or substantially prevent a short circuit and allow movement of ions (e.g., lithium ions). The separator 13 may be formed of a polypropylene film, a polyethylene film, or a film including polyethylene and polypropylene. However, according to embodiments of the present invention, materials that can be used to form the separator 13 are not limited to the above-mentioned materials.

In one embodiment, both ends of the electrode assembly 10 are coupled with a first collector plate 20 and a second collector plate 30, respectively, that are electrically connected respectively to the first and second electrode plates 11 and 12.

The first collector plate 20, in one embodiment, is formed of a conductive material, such as aluminum, and makes contact with the first electrode non-coating portion 11a protruding from an end of the electrode assembly 10 to be electrically connected to the first electrode plate 11. Referring to FIGS. 2 and 3, the first collector plate 20 may include a first connection part 23, a first bent part 22, a fuse unit 25, and a first extension part 21.

The first connection part 23 may be shaped as a plate to be connected to the first electrode non-coating portion 11a of the first electrode plate 11. The first connection part 23, in one embodiment, includes a head part 23a connected to the first bent part 22 and a support part 23b extending from the head part 23a and making contact with the first electrode non-coating portion 11a. The support part 23b may be provided as a plurality of support parts 23b in a same number as a number of electrode assemblies 10. For example, as shown in FIG. 3, two support parts 23b may be provided to be connected to two electrode assemblies 10.

In one embodiment, the first bent part 22 is bent and extends from a top end of the first connection part 23 to be connected to one end of the fuse unit 25. The first bent part 22 may be disposed such that the one end of the fuse unit 25 is perpendicular to a top end of the first connection part 23 about the first bent part 22. In one embodiment, the bent part 22 may be connected to the one end of the fuse unit 25 by at least one of welding, riveting, or caulking.

The fuse unit 25 and a region of the first collector plate 20 other than the fuse unit 25 may be formed using different materials. That is, the fuse unit 25 may be formed of a different material from the first collector plate 20, except for the fuse unit 25. In one embodiment, the fuse unit 25 may be formed of at least one of stainless steel (SUS), nickel, or steel, which have a high electrical resistance, compared to aluminum (Al) or another material forming the first collector plate 20. In another embodiment, the fuse unit 25 may be formed on the second collector plate 30 and may be formed of at least one of stainless steel (SUS), nickel, or steel, which have a high electrical resistance, compared to copper (Cu) or another material forming the second collector plate 30. Referring to FIG. 5, due to the high electrical resistance characteristic of the material forming the fuse unit 25, such as stainless steel (SUS), nickel, or steel, the material forming the fuse unit 25 is more rapidly melted than aluminum (Al) forming the first collector plate 20 or copper (Cu) forming the second collector plate 30. Therefore, the fuse unit 25 is melted within a shorter period of time than the regions of the first collector plate 20 other than the fuse unit 25 by heat generated when a large amount of current flows in the first collector plate 20, such as due to an internal short circuit or an external short circuit due to an external conductive object, thereby serving as a fuse that cuts off the flow of current between the case 40 or the cap plate 51 and the first electrode terminal 52. In addition, the fuse function of the fuse unit 25 allows the rechargeable battery 100 to reach a neutral cell state, thereby improving the safety of the rechargeable battery 100.

Here, the internal short circuit may include a short circuit due to overcharge of the rechargeable battery 100, or a short circuit due to intrinsic defects or impact deformation of the electrode assembly 10, the first collector 20, or the second collector 30, which are housed in the case 40. The short circuit due to overcharge of the rechargeable battery 100 may be generated by contact between the first short circuit plate 60 and the second short circuit plate 61 when heat is generated due to overcharge of the rechargeable battery 100 and the internal pressure of the rechargeable battery 100 rises due to decomposition of an electrolyte.

Accordingly, the fuse unit 25 is melted by the short circuit due to overcharge, thereby cutting off in advance the flow of current, thereby interrupting a charge or discharge operation of the rechargeable battery 100 before a risk, such as fire or explosion, is caused.

The external short circuit by the external conductive object may be generated when the case 40, the cap plate 51, or the first electrode terminal 52 functioning as a positive electrode and the second electrode terminal 53 functioning as a negative electrode are electrically connected to each other by the external conductive object. In this case, the fuse unit 25 is melted and cuts off in advance the flow of current, thereby interrupting a charge or discharge operation of the rechargeable battery 100 before a risk, such as fire or explosion, is caused.

The fuse unit 25, in one embodiment, may include a fuse body 26, a fuse hole 27, and a fuse protrusion 28.

The fuse body 26 is shaped as a plate having one end connected to the first bent part 22 and the other end connected to the first extension part 21. That is, the fuse body 26 extends from the first bent part 22 to be connected to the first extension part 21. In one embodiment, the fuse body 26 is located at a region spaced apart from the terminal hole 24 by a predetermined distance so as not to overlap the first electrode terminal 52 engaged in the terminal hole 24 of the first extension part 21.

The fuse hole 27 is formed to penetrate one surface of the fuse body 26 and the other surface of the fuse body 26 opposite to the one surface. That is, in one embodiment, the fuse hole 27 is formed to penetrate top and bottom surfaces of the fuse body 26. In one embodiment, a cross-sectional area of the fuse body 26 having the fuse hole 27 is smaller than that of a region of the first collector plate 20 other than the fuse body 26. In one embodiment, the cross-sectional area of the fuse body 26 having the fuse hole 27 is smaller than that of the first extension part 21 of the first collector plate 20. In one embodiment, a width "Wh" of the fuse hole 27 in a widthwise direction may be smaller than a width "Wc" of the first extension part 21 connected to the fuse body 26. The fuse hole 27 may be shaped as a rectangle horizontally elongated toward the fuse protrusion 28, i.e. a rectangle elongated in a widthwise direction of the fuse body 26; however, in other embodiments, the shape of the fuse hole 27 is not limited to the shape shown in FIG. 3. In one embodiment, the fuse hole 27 may be formed as a groove having a smaller thickness than other parts of the fuse body 26, instead of a hole penetrating the fuse body 26.

In one embodiment, the fuse protrusion 28 may extend from at least one of first and second sides of the fuse body 26 adjacent to first and second ends of the fuse hole 27. In other words, the fuse protrusion 28 may be formed at either or both of left and right sides of the fuse hole 27. In one embodiment, the fuse protrusion 28 is bent upward or downward with respect to an upper or lower surface of the fuse body 26. The fuse protrusion 28 functions to reinforce the strength of a region surrounding the fuse hole 27, that is, the fuse body 26. Accordingly, the fuse protrusion 28 may prevent or substantially prevent the fuse body 26 from being bent or damaged against external impacts. In addition, the fuse protrusion 28 may form a current path together with the first connection part 23 and the first extension part 21. The fuse protrusion 28 allows the current flowing between the first connection part 23 and the first extension part 21 to be diverted to the fuse protrusion 28, thereby extending a time in which the current flows in a narrow area. Accordingly, the fuse protrusion 28 may increase the reliability of the fuse unit 25 functioning as a fuse by generating a large amount of heat due to a short circuit of the rechargeable battery 100.

The first extension part 21 is installed between a top portion of the electrode assembly 10 and a bottom portion of the cap assembly 50. The first extension part 21 may be shaped as a plate and may have the width "Wc." The first extension part 21 extends from the other end of the fuse body 26 and is connected to the first electrode terminal 52. In one embodiment, the first extension part 21 may be connected to the other end of the fuse body 26 by at least one of welding, riveting, or caulking. The first extension part 21 may further include a terminal hole 24 formed therein to penetrate the first extension part 21. The terminal hole 24 provides a space into which the first electrode terminal 52 is fitted to be engaged therewith.

The second collector plate 30, in one embodiment, is formed from a conductive material, such as nickel or copper, and makes contact with the second electrode non-coating portion 12a protruding from the other end of the electrode assembly 10 to be electrically connected to the second electrode plate 12. The second collector plate 30 may include a second connection part 33, a second bent part 32, and a first extension part 31.

The second collector plate 30 may be the same in configuration and function as the first collector plate 20 shown in FIG. 3, and, therefore, repeated descriptions thereof are omitted. In one embodiment, the second collector plate 30 may have another fuse unit corresponding to the fuse unit 25 of the first collector plate 20. In one embodiment, the first collector plate 20 made of aluminum (Al) has a lower melting point than the second collector plate 30 made of nickel or copper, and the fuse function can be more easily achieved. Further, if the fuse function is not properly performed by the fuse unit 25 of the first collector plate 20, the rechargeable battery 100 may nonetheless perform the fuse function.

The case 40 may be formed of a conductive metal, such as aluminum, aluminum alloy, or steel plated with nickel. The case 40 may have a generally hexahedral shape with an opening such that the electrode assembly 10, the first collector plate 20, and the second collector plate 30 may be inserted and housed in the case 40. FIG. 2 illustrates a state in which the case 40 and the cap assembly 50 are coupled to each other, and the opening of the case 40 is not shown. However, a peripheral part of the cap assembly 50 may substantially correspond to the opening of the case 40. In one embodiment, an inner surface of the case 40 may be treated to be electrically insulated from the electrode assembly 10, the first and second collector plates 20 and 30, and the cap assembly 50. In one embodiment, the case 140 may have a polarity and may function as a positive electrode, for example.

The cap assembly 50 is coupled to the case 40. In one embodiment, the cap assembly 50 may include a cap plate 51, the first electrode terminal 52, the second electrode terminal 53, gaskets 54, and nuts 55. In addition, the cap assembly 50 may further include a plug 56, a vent plate 57, a connection plate 58, an upper insulation member 59, a first short-circuiting plate 60, a second short-circuiting plate 61, and a lower insulation member 62.

The cap plate 51 may close or seal the opening of the case 40 and may be formed of the same material as that used to form the case 40. In one embodiment, the cap plate 51 and the case 40 may have the same polarity.

The first electrode terminal 52 may penetrate through a side of the cap plate 51 and may be electrically connected to the first collector plate 20. The first electrode terminal 52 may be formed in a pillar shape. A screw thread may be formed on an outer peripheral edge of an upper pillar portion exposed upward from the cap plate 51, and a flange 52a may be formed on a lower pillar portion positioned at a lower portion of the cap plate 51 to prevent or substantially prevent separation of the first electrode terminal 52 from the cap plate 51. A part of the first electrode terminal 52 lower than or under the flange 52a may be inserted into the first terminal hole 24 of the first collector plate 20. In one embodiment, the first electrode terminal 52 may be electrically connected to the cap plate 51.

The second electrode terminal 53 may penetrate through another side of the cap plate 51 and may be electrically connected to the second collector plate 30. In one embodiment, the second electrode terminal 53 has a same shape as the first electrode terminal 52, and, therefore, a repeated description thereof is omitted. In one embodiment, the second electrode terminal 53 is insulated from the cap plate 51.

The gaskets 54 may be formed of an insulating material and may be disposed between the cap plate 51 and the first and second electrode terminals 52 and 53 to seal gaps between the cap plate 51 and the first and second electrode terminals 52 and 53. The gaskets 54 may prevent or substantially prevent permeation of moisture into the rechargeable battery 100 and prevent or substantially prevent leakage of the electrolyte from the rechargeable battery 100.

In one embodiment, the nuts 55 are engaged with screw threads formed on the first electrode terminal 52 and the second electrode terminal 53 to fix the first electrode terminal 52 and the second electrode terminal 53 to the cap plate 51.

The plug 56 may close an electrolyte injection hole 51a of the cap plate 51. The vent plate 57 may be disposed on a vent hole 51b of the cap plate 51, and a notch 57a may be formed in the vent plate 57 such that the vent plate 57 may be opened at or above a certain pressure (e.g., a predetermined pressure).

The connection plate 58 is formed to be inserted between the first electrode terminal 52 and the cap plate 51 and makes close contact with the cap plate 51 and the gaskets 54 through the nuts 55. The connection plate 58 is electrically connected to the first electrode terminal 52 and the cap plate 51.

The upper insulation member 59 is formed to be inserted between the second electrode terminal 53 and the cap plate 51 and makes close contact with the cap plate 51 and the gaskets 54. The upper insulation member 59 insulates the second electrode terminal 53 from the cap plate 51.

The first short-circuiting plate 60 is disposed in a short circuit hole 51c of the cap plate 51 between the upper insulation member 59 and the cap plate 51. The first short-circuiting plate 60, in one embodiment, includes an invertible plate having a downwardly convex round part and an edge part that is fixed to the cap plate 51. When an overcharge occurs to the rechargeable battery 100 and the internal pressure of the rechargeable battery 100 becomes higher than a certain pressure (e.g., a predetermined pressure), the first short-circuiting plate 60 may be inverted to then protrude in an upwardly convex configuration. The first short-circuiting plate 60 and the cap plate 51 have the same polarity.

The second short-circuiting plate 61 is formed to extend to cover the short circuit hole 51c, and the second electrode terminal 53 is inserted into the second short-circuiting plate 61 from the outside of the second short-circuiting plate 61 spaced apart from the cap plate 51, that is, from an upper side of the upper insulation member 59. The second short-circuiting plate 61 is electrically connected to the second electrode terminal 53. The second short-circuiting plate 61 makes contact with the first short-circuiting plate 60 that protrudes in an upwardly convex configuration when an overcharge occurs to the rechargeable battery 100 and the internal pressure of the rechargeable battery 100 becomes higher than a certain pressure (e.g., a predetermined pressure), thereby causing a short circuit. The short circuit causes a large amount of current to flow in the rechargeable battery 100 to generate heat. Here, the fuse unit 25 functions as a fuse, thereby improving the safety of the rechargeable battery 100.

The lower insulation member 62, in one embodiment, may be disposed between each of the first collector plate 20 and the second collector plate 30 and the cap plate 51, thereby preventing or substantially preventing an unnecessary short circuit.

As described above, in the rechargeable battery 100 according to an embodiment of the present invention, the fuse unit 25 and other regions of the first collector plate 20 are formed of different materials, thereby rapidly cutting off a flow of current by allowing the fuse unit 25 to be rapidly melted in an occurrence of an internal short circuit, an external short circuit due to an external conductive object, or a short circuit due to penetration of an external conductive object. Further, when a short circuit is generated in the rechargeable battery 100 according to an embodiment of the present invention, a battery case is changed in a state of a neutral cell, thereby increasing the reliability of the fuse unit 25 functioning as a fuse and improving the safety of the battery 100. As such, the rechargeable battery 100 according to an embodiment of the present invention has improved safety and is suited for use as a motor-driving power source for propelling electric scooters, hybrid vehicles, or electric vehicles.

Figure 6A:
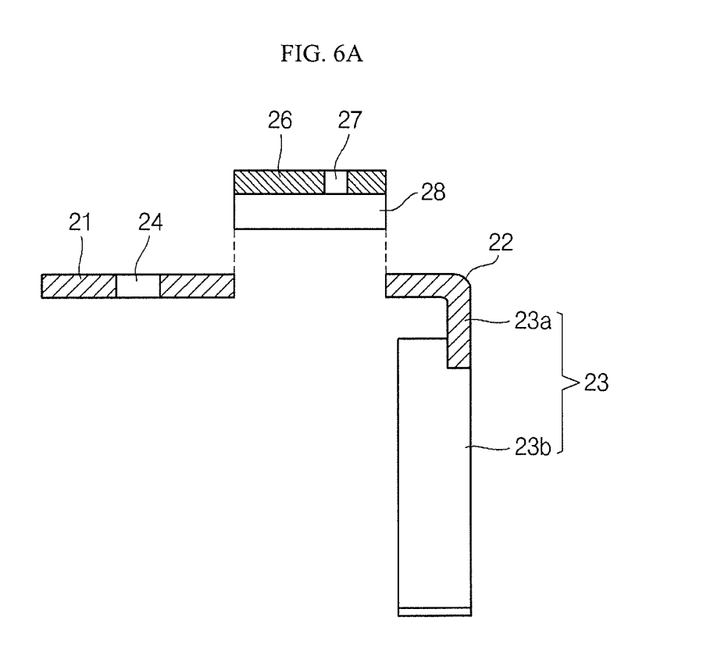
FIGS. 6A and 6B are schematic sectional views, taken along the line III-III' of FIG. 3, illustrating a connection method of a first collector plate and a fuse unit, according to an exemplary embodiment of the present invention.
Figure 6B:
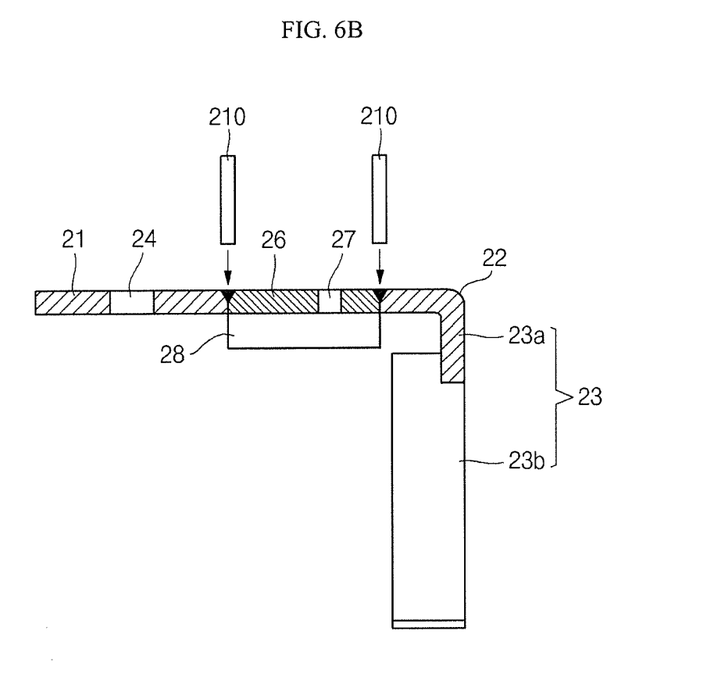

FIGS. 6A and 6B are schematic sectional views, taken along the line III-III' of FIG. 3, illustrating a connection method of a first collector plate and a fuse unit, according to an exemplary embodiment of the present invention.

Referring to FIG. 6A, in the first collector plate 20, in a disconnected state in which the first connection part 23 connected to the first electrode non-coating portion 11a of the first electrode plate 11 is separated from the first extension part 21 connected to the first bent part 22 and the first electrode terminal 52, the fuse unit 25 is positioned in the separated area, and the fuse body 26 of the fuse unit 25 is inserted between the first bent part 22 and the first extension part 21. In one embodiment, the first collector plate 20 may be formed of, for example, aluminum, aluminum alloy, copper, or copper alloy. Also, in one embodiment, the fuse unit 25 may be formed of, for example, stainless steel (SUS), nickel, steel, or alloys thereof. Thus, in one embodiment, the first collector plate 20 and the fuse body 26 may be welded to each other. While FIG. 6A illustrates a disconnected state in which the first connection part 23 connected to the first electrode plate 11 is separated from the first extension part 21 connected to the first bent part 22 and the first electrode terminal 52, embodiments of the present invention are not limited thereto. For example, in another embodiment, the first collector plate 20 may have a hole formed therein to be shaped to correspond to the fuse body 26 so that the fuse body 26 is inserted and connected. In addition, protrusions supported to the first bent part 22 and the first extension part 21 may be formed on top and bottom surfaces of the fuse body 26. Conversely, grooves may be formed in the first bent part 22 and a side surface of the first extension part 21 connected to the fuse body 26 for fixing the fuse body 26.

Referring to FIG. 6B, in one embodiment, the fuse unit 25 is inserted between the first bent part 22 and the first extension part 21. That is, the fuse body 26 of the fuse unit 25 is inserted into a space between the first bent part 22 and the first extension part 21 to be mounted therein. Then, in one embodiment, the first bent part 22 and one side of the fuse body 26, and the first extension part 21 and the other side of the fuse body 26 are welded to each other. Ultrasonic welding, laser welding, or diffusion welding based on diffusion of atoms using heat of a furnace may be used, but embodiments of the present invention are not limited thereto. For example, in one embodiment, as depicted in FIG. 6B, laser beams may be supplied to a boundary area between the first bent part 22 and the one side of the fuse body 26, and the first extension part 21 and the other side of the fuse body 26 by a laser welding tool 210, thereby fusing the first bent part 22 and the one side of the fuse body 26, and the first extension part 21 and the other side of the fuse body 26. Thereafter, if the supplying of the laser beams is stopped, the fused parts are cooled, so that the first bent part 22 and the one side of the fuse body 26 are welded to the first extension part 21 and the other side of the fuse body 26.

As described above, according to embodiments of the present invention, the first collector plate 20, which may be formed of, for example, aluminum, aluminum alloy, copper, or copper alloy, may be welded to the fuse body 26 of the fuse unit 25, which may be formed of, for example, stainless steel (SUS), nickel, or steel, by welding, such as ultrasonic welding, laser welding, or diffusion welding.

Figure 7A:
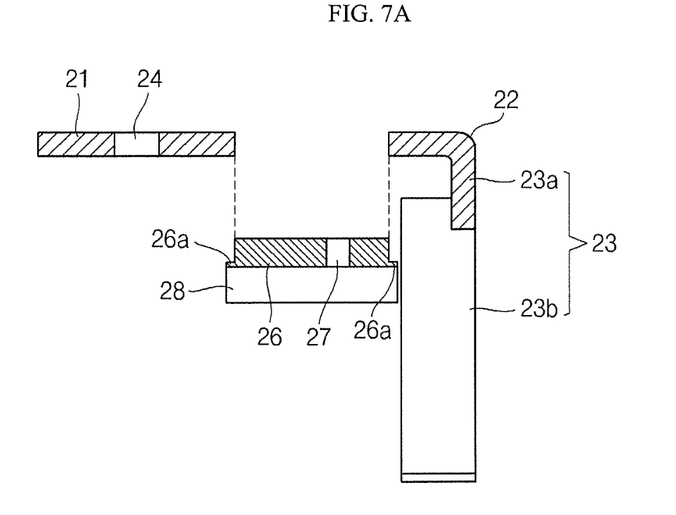
FIGS. 7A and 7B are schematic sectional views, taken along the line III-III' of FIG. 3, illustrating a connection method of a first collector plate and a fuse unit, according to another exemplary embodiment of the present invention.
Figure 7B:
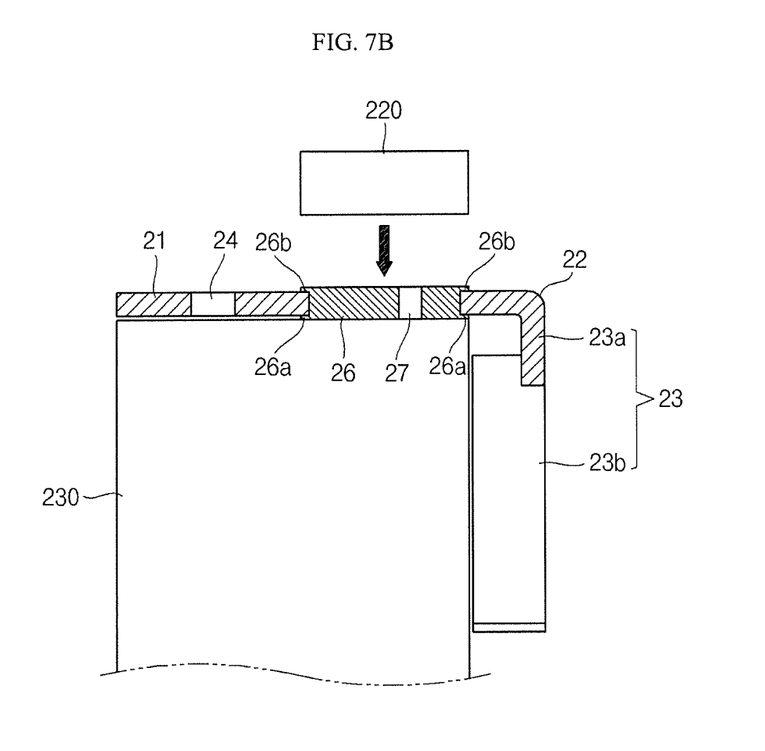

FIGS. 7A and 7B are schematic sectional views, taken along the line III-III' of FIG. 3, illustrating a connection method of a first collector plate and a fuse unit, according to another exemplary embodiment of the present invention.

Referring to FIG. 7A, in the first collector plate 20, in a disconnected state in which the first connection part 23 connected to the first electrode non-coating portion 11a of the first electrode plate 11 is separated from the first extension part 21 connected to the first bent part 22 and the first electrode terminal 52, the fuse unit 25 is positioned above or below the region of separation, and the fuse body 26 of the fuse unit 25 is inserted between the first bent part 22 and the first extension part 21. Here, the first collector plate 20 may be formed of, for example, aluminum, aluminum alloy, copper, or copper alloy. In addition, the fuse unit 25 may be formed of, for example, stainless steel (SUS), nickel, steel, or alloys thereof. In one embodiment, protrusions 26a and 26b supported to the first bent part 22 and the first extension part 21 may be formed on top and bottom surfaces of the fuse body 26 of the fuse unit 25. For example, in one embodiment, the fuse unit 25 is inserted into the region of separation below the first collector plate 20, and the protrusions 26a horizontally protruding are formed at both sides of the bottom surface of the fuse body 26. Although not shown, grooves may be formed in the first bent part 22 and a side of the first extension part 21 connected to the fuse body 26 such that the protrusions 26a of the fuse body 26 may be mounted therein.

Referring to FIG. 7B, the fuse unit 25 is inserted between the first bent part 22 and the first extension part 21. That is, the fuse body 26 of the fuse unit 25 is inserted into a space between the first bent part 22 and the first extension part 21 to be mounted therein. In one embodiment, in order to support bottom surfaces of the first bent part 22, the fuse body 26. and the first extension part 21 to an inner space including the first bent part 22, the fuse unit 25, and the first extension part 21, a support member 230 having a flat top surface is disposed under the fuse body 26. Then, a top surface of the fuse body 26 inserted between the first bent part 22 and the first extension part 21 is struck, such as using a rivet hammer 220, or the surface of the fuse body 26 is caulked using a caulking device to flatten the top surface of the fuse body 26, thereby filling the spaces between each of the first bent part 22 and the first extension part 21 and the fuse body 26 using the flattened top surface of the fuse body 26. Here, the protrusions 26b that horizontally protrude are formed at both sides of the top surface of the fuse body 26, thereby allowing the fuse unit 25 to be fixedly connected to the first bent part 22 and the first extension part 21.

As described above, according to embodiments of the present invention, the fuse body 26 of the fuse unit 25 formed of, for example, stainless steel (SUS), nickel, or steel, may be fixedly connected to the first collector 20 formed of, for example, aluminum, aluminum alloy, copper, or copper alloy, by riveting or caulking.

While the present invention has been particularly shown and described with reference to some exemplary embodiments thereof, it will be understood by those of ordinary skill in the art that various changes in form and details may be made therein without departing from the spirit and scope of the present invention as set forth in the following claims.

What is claimed is:

1. A rechargeable battery comprising:
   an electrode assembly comprising a first electrode plate, a second electrode plate, and a separator between the first electrode plate and the second electrode plate;
   a first collector plate electrically connected to the first electrode plate and including a fuse unit therein;
   a second collector plate electrically connected to the second electrode plate; and
   a case housing the electrode assembly, the first collector plate, and the second collector plate,
   wherein the fuse unit comprises a plate-shaped fuse body formed of a first material and having a fuse hole formed therein, and regions of the first collector plate other than the fuse unit are formed of a second material different from the first material, a cross-sectional area of a portion of the fuse body having the fuse hole being smaller than that of the regions of the first collector plate other than the fuse unit.

2. The rechargeable battery of claim 1, wherein the first material has an electrical resistance greater than that of the second material.

3. The rechargeable battery of claim 1, wherein the second material is copper or aluminum.

4. The rechargeable battery of claim 1, wherein the first material is stainless steel, nickel, or steel.

5. A rechargeable battery comprising:
- an electrode assembly comprising a first electrode plate, a second electrode plate, and a separator between the first electrode plate and the second electrode plate:
- a first collector plate electrically connected to the first electrode plate and including a fuse unit therein;
- a second collector plate electrically connected to the second electrode plate; and
- a case housing the electrode assembly, the first collector plate, and the second collector plate,
- wherein the fuse unit is formed of a first material, and regions of the first collector plate other than the fuse unit are formed of a second material different from the first material, and
- wherein the fuse unit comprises:
  - a fuse body shaped as a plate;
  - a fuse hole penetrating both a surface of the fuse body and another surface opposite the surface; and
  - a fuse protrusion extending from at least one of first and second sides of the fuse body adjacent to respective first and second ends of the fuse hole.

6. The rechargeable battery of claim 5, wherein a cross-sectional area of a portion of the fuse body having the fuse hole is smaller than that of the regions of the first collector plate other than the fuse unit.

7. The rechargeable battery of claim 5, wherein the fuse protrusion is bent upward or downward with respect to the surface of the fuse body.

8. The rechargeable battery of claim 5, further comprising a first electrode terminal and a second electrode terminal electrically connected to the first collector plate and the second collector plate, respectively.

9. The rechargeable battery of claim 8, wherein the first collector plate comprises:
- a connection part connected to the first electrode plate;
- a bent part bent and extending from a first end of the connection part and connected to an end of the fuse body; and
- an extension part extending from another end of the fuse body and connected to the first electrode terminal.

10. The rechargeable battery of claim 9, wherein the bent part is connected to the end of the fuse body by at least one of welding, riveting, or caulking.

11. The rechargeable battery of claim 9, wherein the extension part is connected to the another end of the fuse body by at least one of welding, riveting, and caulking.

12. The rechargeable battery of claim 9, wherein the extension part has a terminal hole penetrating top and bottom surfaces of the extension part, and the first electrode terminal is connected to the extension part through the terminal hole.

13. The rechargeable battery of claim 9, wherein a width of the fuse hole in a widthwise direction is less than a width of the extension part in the widthwise direction.

14. The rechargeable battery of claim 8, further comprising a cap assembly including a cap plate sealing an opening of the case, wherein the first electrode terminal and the second electrode terminal protrude to an outside of the case through the cap plate.

* * * * *